United States Patent
Zhou et al.

(10) Patent No.: US 12,020,230 B2
(45) Date of Patent: Jun. 25, 2024

(54) METHOD FOR CARD READING, PAYMENT TERMINAL AND TERMINAL DEVICE

(71) Applicant: PAX COMPUTER TECHNOLOGY (SHENZHEN) CO., LTD., Guangdong (CN)

(72) Inventors: Aiping Zhou, Guangdong (CN); Jiansheng Zeng, Guangdong (CN); Jiale Ren, Guangdong (CN); Huan Wang, Guangdong (CN)

(73) Assignee: PAX COMPUTER TECHNOLOGY (SHENZHEN) CO., LTD., Shenzhen (CN)

( * ) Notice: Subject to any disclaimer, the term of this patent is extended or adjusted under 35 U.S.C. 154(b) by 622 days.

(21) Appl. No.: 17/626,686

(22) PCT Filed: Mar. 25, 2019

(86) PCT No.: PCT/CN2019/079535
§ 371 (c)(1),
(2) Date: Jan. 12, 2022

(87) PCT Pub. No.: WO2019/184876
PCT Pub. Date: Oct. 3, 2019

(65) Prior Publication Data
US 2022/0245610 A1 Aug. 4, 2022

(30) Foreign Application Priority Data
Mar. 26, 2018 (CN) .......................... 201810251229.0

(51) Int. Cl.
*G06Q 20/20* (2012.01)
*G06K 7/00* (2006.01)
(52) U.S. Cl.
CPC ......... *G06Q 20/204* (2013.01); *G06K 7/0004* (2013.01)

(58) Field of Classification Search
CPC .......................... G06Q 20/204; G06K 7/0004
See application file for complete search history.

(56) References Cited

U.S. PATENT DOCUMENTS

| | | | |
|---|---|---|---|
| 9,760,740 B1* | 9/2017 | Edwards | G06Q 20/352 |
| 2016/0253655 A1* | 9/2016 | Yokoyama | G06K 7/10386 |
| | | | 705/17 |
| 2020/0210995 A1* | 7/2020 | Cho | G06Q 20/326 |

FOREIGN PATENT DOCUMENTS

| | | |
|---|---|---|
| CN | 2489398 Y | 5/2002 |
| CN | 201392542 Y | 1/2010 |

(Continued)

OTHER PUBLICATIONS

International Search Report for International Application No. PCT/CN2019/079535; Date of Completion: Jun. 18, 2019; dated Jul. 1, 2019; 3 Pages.

(Continued)

*Primary Examiner* — Paul Danneman
(74) *Attorney, Agent, or Firm* — CANTOR COLBURN LLP

(57) ABSTRACT

The present solution provides a method for card reading, the method includes: turning on a read head of the magnetic stripe card, a read head of the contact IC card, and a coil of the non-contact IC card; detecting card reading actions; turning off, if the card inserting action is detected, the coil of the non-contact IC card; powering on the card when the card reaches a bottom of a card slot of the payment terminal; controlling, if the card is successfully powered on, the read head of contact IC card to read the card; controlling, if the card fails to be powered on, the read head of the magnetic stripe card to read the card when the card swiping action is detected; and controlling, if the card waving action is detected, the coil of the non-contact IC card to read card.

17 Claims, 8 Drawing Sheets

(56) References Cited

FOREIGN PATENT DOCUMENTS

| CN | 103034824 A | 4/2013 |
| CN | 106682556 A | 5/2017 |
| CN | 206178845 U | 5/2017 |
| CN | 108563968 A | 9/2018 |
| JP | 2005025849 A | 1/2005 |

OTHER PUBLICATIONS

English Translation of International Search Report for International Application No. PCT/CN2019/079535; Date of Completion: Jun. 18, 2019; dated Jul. 1, 2019; 2 Pages.
Written Opinion for International Application No. PCT/CN2019/079535; dated Jul. 1, 2019; 4 Pages.
English Translation of Written Opinion for International Application No. PCT/CN2019/079535; dated Jul. 1, 2019; 4 Pages.

* cited by examiner

METHOD FOR CARD READING, PAYMENT TERMINAL AND TERMINAL DEVICE

CROSS REFERENCE TO RELATED APPLICATIONS

This application is a National Stage Appl. filed under 35 USC 371 of International Patent Application No. PCT/CN2019/079535 with an international filing date of Mar. 25, 2019, designating the USA, now pending, and further claims foreign priority benefits of Chinese Patent Application No. 201810251229.0 filed on Mar. 26, 2018. The contents of all of the aforementioned applications, including any intervening amendments thereto, are incorporated herein by reference.

TECHNICAL FIELD

The present application relates to the technical field of payment terminals, and more particularly to a method for card reading, a payment terminal, and a terminal device.

BACKGROUND

With the continuous popularization of UnionPay cards and stored-value cards, various payment terminals that can realize the quick payment function of UnionPay cards are also emerging in an endless stream, bringing great convenience to people's lives. Existing payment terminals usually require card reading function of magnetic stripe cards, contact IC cards, and non-contact IC cards at the same time. The traditional payment terminals have a relatively large volume, and the card reading areas for reading different types of cards are arranged separately and do not interfere with each other.

However, the existing small-volume payment terminals, due to the limited space that can be used to arrange the card reading area, which causes the card reading areas to be closer, and there is a relatively obvious interference problem, which increases the difficulty of the development of the card reading program, and causes a certain amount of trouble for program developers.

Technical Problem

In view of this, the embodiments of the present application provide a method for card reading, a payment terminal, and a terminal device to solve the problem of the existing small-volume payment terminal. Due to the limited space available for arranging the card reading area, the distance between each card reading area is relatively short, and there is a relatively obvious interference problem, which increases the difficulty of the development of the card reading program and causes a certain problem for the program developer.

SUMMARY

In a first aspect, an embodiment of the present application provides a method for card reading, applied to a payment terminal, the payment terminal being equipped with reading function to a magnetic stripe card, a contact IC card, and a non-contact IC card, and the method includes:

turning on a read head of the magnetic stripe card, a read head of the contact IC card, and a coil of the non-contact IC card;

detecting card reading actions; wherein the card reading actions comprise card an inserting action, a card swiping action, and a card waving action;

turning off, if the card inserting action is detected, the coil of the non-contact IC card;

powering on the card when the card reaches a bottom of a card slot of the payment terminal;

controlling, if the card is successfully powered on, the read head of contact IC card to read the card;

controlling, if the card fails to be powered on, the read head of the magnetic stripe card to read the card when the card swiping action is detected; and controlling, if the card waving action is detected, the coil of the non-contact IC card to read card.

In a second aspect, an embodiment of the present application provides a terminal device, which includes a memory, a processor, and a computer program stored in the memory and running on the processor, and when the processor executes the computer program to implement steps of the method described above, and the computer program includes:

a read head turning on module, configured for turning on a read head of the magnetic stripe card, a read head of the contact IC card, and a coil of the non-contact IC card;

an action detecting module, configured for detecting card reading actions; wherein the card reading actions comprise card an inserting action, a card swiping action, and a card waving action;

a turning off module, configured for turning off, if the card inserting action is detected, the coil of the non-contact IC card;

a powering on module, configured for powering on the card when the card reaches a bottom of a card slot of the payment terminal;

a first read head controlling module, configured for controlling, if the card is successfully powered on, the read head of contact IC card to read the card;

a second read head controlling module, configured for controlling, if the card fails to be powered on, the read head of the magnetic stripe card to read the card when the card swiping action is detected; and a third read head controlling module, configured for controlling, if the card waving action is detected, the coil of the non-contact IC card to read card.

In a third aspect, an embodiment of the present application provides a computer-readable storage medium, storing with a computer program, and the computer program is executed by a processor to implement steps of the method described above.

Beneficial Effects

The embodiments of the present application provide a method for card reading, a payment terminal, and a terminal device applied to a payment terminal. By turning off the coil of the non-contact IC card when the card inserting action is detected, the interference caused by the coil of the non-contact IC card onto the read heads of the magnetic strip card and the contact IC card can be eliminated; when the card reaches the bottom of the card slot of the payment terminal, the card is powered on, and when the card is successfully powered on, the read head of the contact IC card can read the card, which improve the success rate of the card reading of the contact IC card; after the card fails to be powered on, when the card swiping action is detected, reading the card through the read head of the magnetic stripe card can increase the success rate of the card reading of the magnetic stripe card; when the card moving action is detected, then the coil of the non-contact IC card is used to read the card, which can increase the success rate of the card reading of the non-contact IC card; the problem of card reading interference of small-volume payment terminal is effectively eliminated, and the difficulty of card reading program development is reduced.

BRIEF DESCRIPTION OF THE DRAWINGS

In order to more clearly describe the technical solutions in the embodiments of the present application, the following will briefly introduce the accompanying drawings needed in the description of the embodiments or the prior art. Obviously, the accompanying drawings in the following description are only of the present application. For some embodiments, those skilled in the art can obtain other drawings based on these drawings without creative labor.

DETAILED DESCRIPTION

In the following description, for the purpose of illustration rather than limitation, specific details such as a specific system structure and technology are proposed for a thorough understanding of the embodiments of the present application. However, it should be clear to those skilled in the art that the present application can also be implemented in other embodiments without these specific details. In other cases, detailed descriptions of well-known systems, devices, circuits, and methods are omitted to avoid unnecessary details from obstructing the description of the present application.

In order to illustrate the technical solutions of the present application, specific embodiments are used for description below.

First Embodiment

Figure 1:
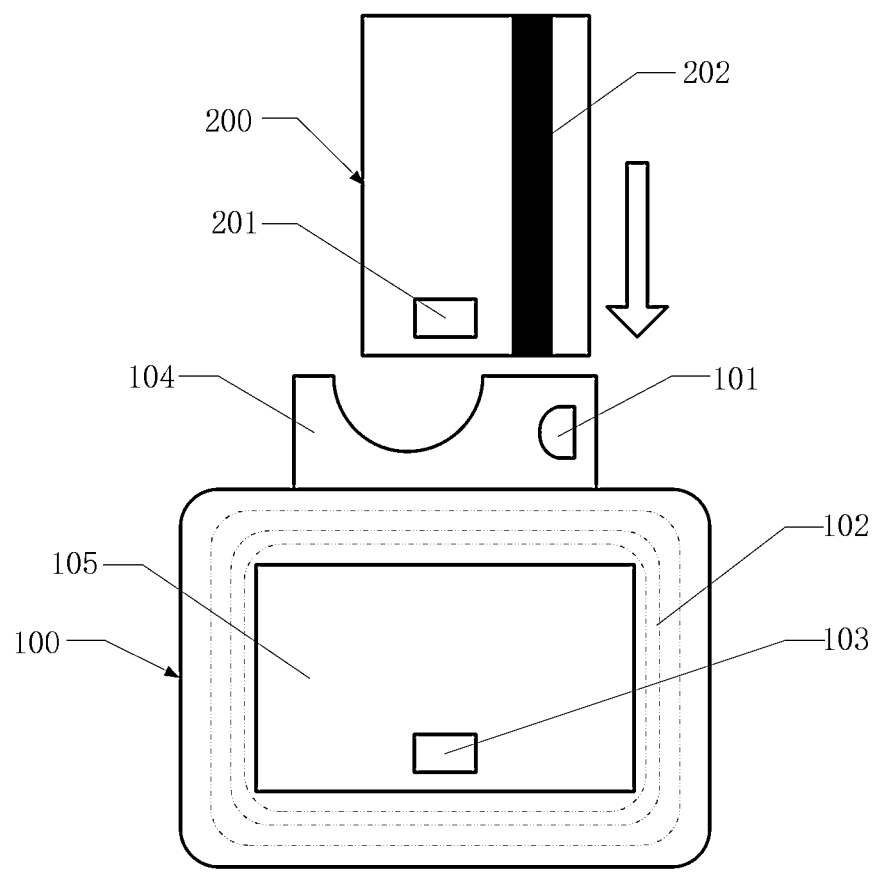
FIG. 1 is a perspective structural diagram of a payment terminal provided by a first embodiment of the present application.

As shown in FIG. 1, an exemplary perspective structure diagram of a small-volume payment terminal is shown. The payment terminal includes a main body 100, a read head 101 of a magnetic card, a coil 102 of a non-contact IC card, and a read head 103 of a contact IC card, the read head 101 of magnetic card is arranged on the side of the inserting slot 104 of the main body 100, the coil 102 of non-contact IC card is arranged around the card slot 105 of the main body 100, and the read head 103 of the contact IC card is arranged on the bottom of the card slot 105.

The payment terminal provided in the embodiment has the card reading functions of the magnetic stripe card, the contact IC card, and the non-contact IC card, and can read at least one functional card selected from a group of the magnetic stripe card, the contact IC card, and the non-contact IC card.

As shown in FIG. 1, when the payment terminal provided by the embodiment realizes the card reading function of the magnetic stripe card or the contact IC card, the contact IC card chip 201 of the card 200 faces the inserting slot 104, and the magnetic strip 202 faces the read head 101 of the magnetic stripe card, and inserts into card slot 105 in the direction of the arrow as shown in the figure.

It should be understood that the perspective structure of the payment terminal shown in FIG. 1 is only exemplary, and is only used to illustrate the basic logical structure of the payment terminal, and is not used to limit the actual structure and functions of the payment terminal. In specific applications, the payment terminal can be implemented by any other structure that conforms to the above-mentioned logical structure, and can also have other additional functions in addition to the card reading function of the magnetic stripe card, the contact IC card, and the non-contact IC card.

Figure 2:
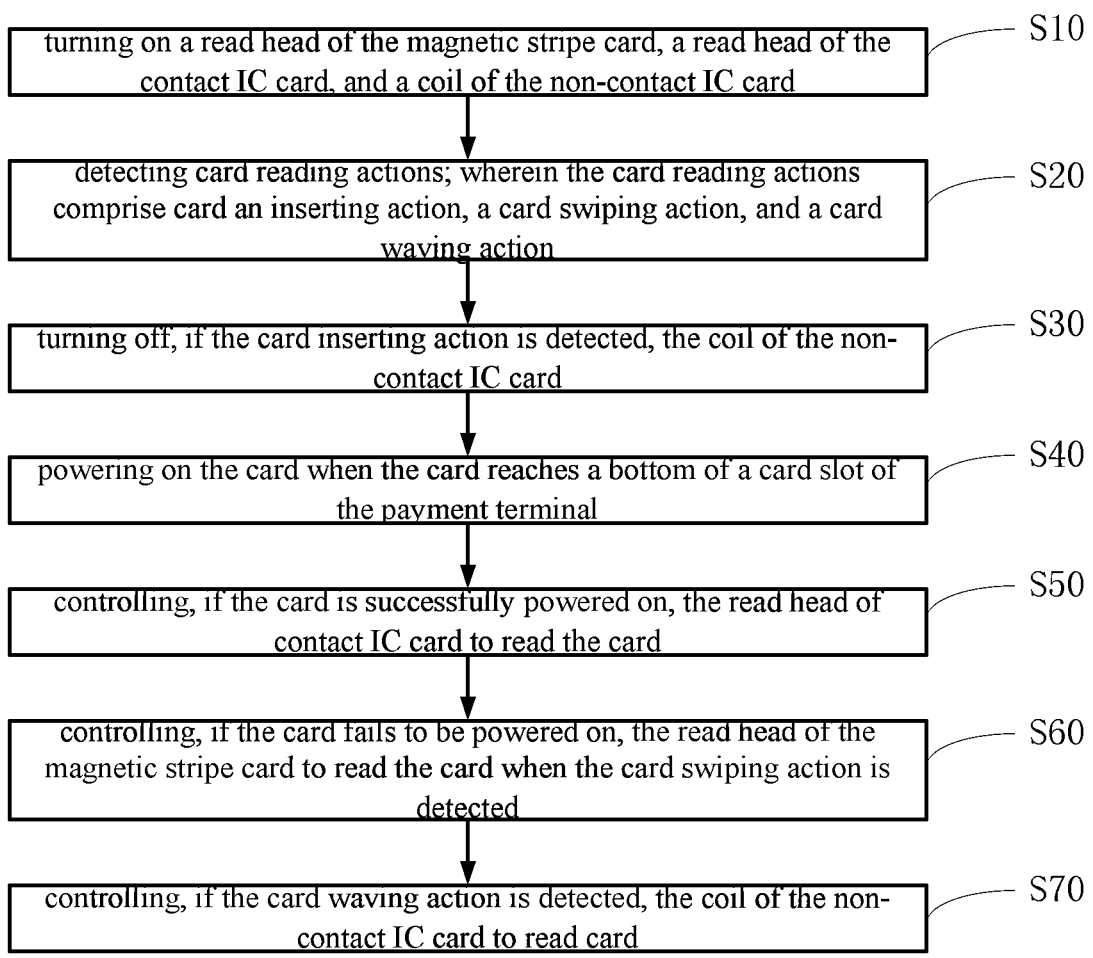
FIG. 2 is a schematic flowchart of a method for card reading provided by a first embodiment of the present application.

As shown in FIG. 2, the embodiment provides a method for card reading, which can be applied to any payment terminal conforming to the logical structure shown in FIG. 1, and the method for card reading includes:

Step S10: turning on a read head of the magnetic stripe card, a read head of the contact IC card, and a coil of the non-contact IC card.

In specific applications, before the card reading action or the card is detected, since the type of card to be read cannot be determined, it is necessary to turn on the read head of the magnetic stripe card, the read head of the contact IC card and the coil of the non-contact IC card at the same time, and standing by at any time and waiting to realize at least one of the card reading functions of the magnetic stripe card, contact IC card and non-contact IC card.

Step S20: detecting card reading actions; wherein the card reading actions comprise card an inserting action, a card swiping action, and a card waving action.

In specific applications, the card reading actions corresponding to different types of cards are different. For example, the card reading action corresponding to the contact IC card is the card inserting action, and the card reading action corresponding to the magnetic stripe card is the card inserting action and card swiping action, and the card reading action corresponding to the non-contact IC card is the card waving action.

In specific applications, the card reading action can be realized by various sensors that can detect the positions of the card, such as proximity sensors, infrared sensors, and pressure sensors and the like, distributed on the inserting slot, the card slot, and the main panel of the payment terminal.

Step S30: turning off, if the card inserting action is detected, the coil of the non-contact IC card.

In specific applications, if a card inserting action is detected, it means that the current card is a magnetic stripe card or a contact IC card, and the coil of the non-contact IC card can be turned off to eliminate the signal interference generated by the coil of the non-contact IC card. Thereby, the success rate of reading the magnetic stripe card or the contact IC card is improved.

Step S40: powering on the card when the card reaches a bottom of a card slot of the payment terminal.

Step S50: controlling, if the card is successfully powered on, the read head of contact IC card to read the card.

Step S60; controlling, if the card fails to be powered on, the read head of the magnetic stripe card to read the card when the card swiping action is detected.

In specific applications, since the card inserted into the card slot may be a magnetic stripe card or a contact IC card, in order to further determine the type of the card, the card needs to be powered on to detect whether the card is a contact IC card. If the card is successfully powered on, it means the card is a contact IC card; if the card fails to be powered on, it means the card is a magnetic stripe card. Since the read head of the magnetic stripe card is arranged in the inserting slot, the card swiping action can be detected (That is, the action when the card is inserted into the bottom of the card slot and then pulled out), control the read head of the magnetic stripe card to read the card.

In addition, for the magnetic stripe card, when the card inserting action is detected, the read head of the magnetic stripe card can detect that the current card is a magnetic stripe card, but the length of the card slot is usually short, and the speed of the card being inserted into the card slot during the card insertion process is uneven and the card reading success rate is low. Therefore, reading the magnetic stripe card during the card pulling process when the card swiping action is detected can increase the success rate of the card reading of the magnetic stripe card.

Step S70: controlling, if the card waving action is detected, the coil of the non-contact IC card to read card.

In specific applications, if a card waving action is detected, it means that the current card is a non-contact IC card, and the coil of the non-contact IC card can be controlled for card reading to improve the success rate of the card reading of the non-contact IC card.

In one embodiment, after step S50, S60 or S70, goes to step S10, that is, after a successful card reading, return to the initial step and enter the standby state again.

In one embodiment, if the card reading action is not changed overtime or the card reading is not successful overtime, a corresponding alarm prompt is issued, and then entering the step S10 after the alarm prompt is removed.

In specific applications, it is not ruled out that the user may use the wrong card reading action to read the card. For example, the user inserts a non-contact IC card into the card slot, puts a magnetic stripe card or a contact IC card close to the coil of the non-contact IC card, do not pull out the card for a long time. In order to avoid the above situation, it is necessary to detect whether the card reading action has not changed overtime or the card has not been successfully read overtime. If the card reading action has not changed overtime or the card has not been read successfully overtime, it is necessary to remind the user to pull out the card according to the current position of the card or keep the card away from the coil of the non-contact IC card.

The embodiments of the present application provide a method for card reading, a payment terminal, and a terminal device applied to a payment terminal. By turning off the coil of the non-contact IC card when the card inserting action is detected, the interference caused by the coil of the non-contact IC card onto the read heads of the magnetic strip card and the contact IC card can be eliminated; when the card reaches the bottom of the card slot of the payment terminal, the card is powered on, and when the card is successfully powered on, the read head of the contact IC card can read the card, which improve the success rate of the card reading of the contact IC card; after the card fails to be powered on, when the card swiping action is detected, reading the card through the read head of the magnetic stripe card can increase the success rate of the card reading of the magnetic stripe card; when the card moving action is detected, then the coil of the non-contact IC card is used to read the card, which can increase the success rate of the card reading of the non-contact IC card; the problem of card reading interference of small-volume payment terminal is effectively eliminated, and the difficulty of card reading program development is reduced.

Second Embodiment

This embodiment is a further refinement of step S20 in the first embodiment, and specifically discloses the process of detecting the card swiping state. According to the various current swiping states, the timing of detecting the card reading action can be determined, so that when the card is in the proper card swiping state, the operation to detect the corresponding card reading action is triggered.

Figure 3:
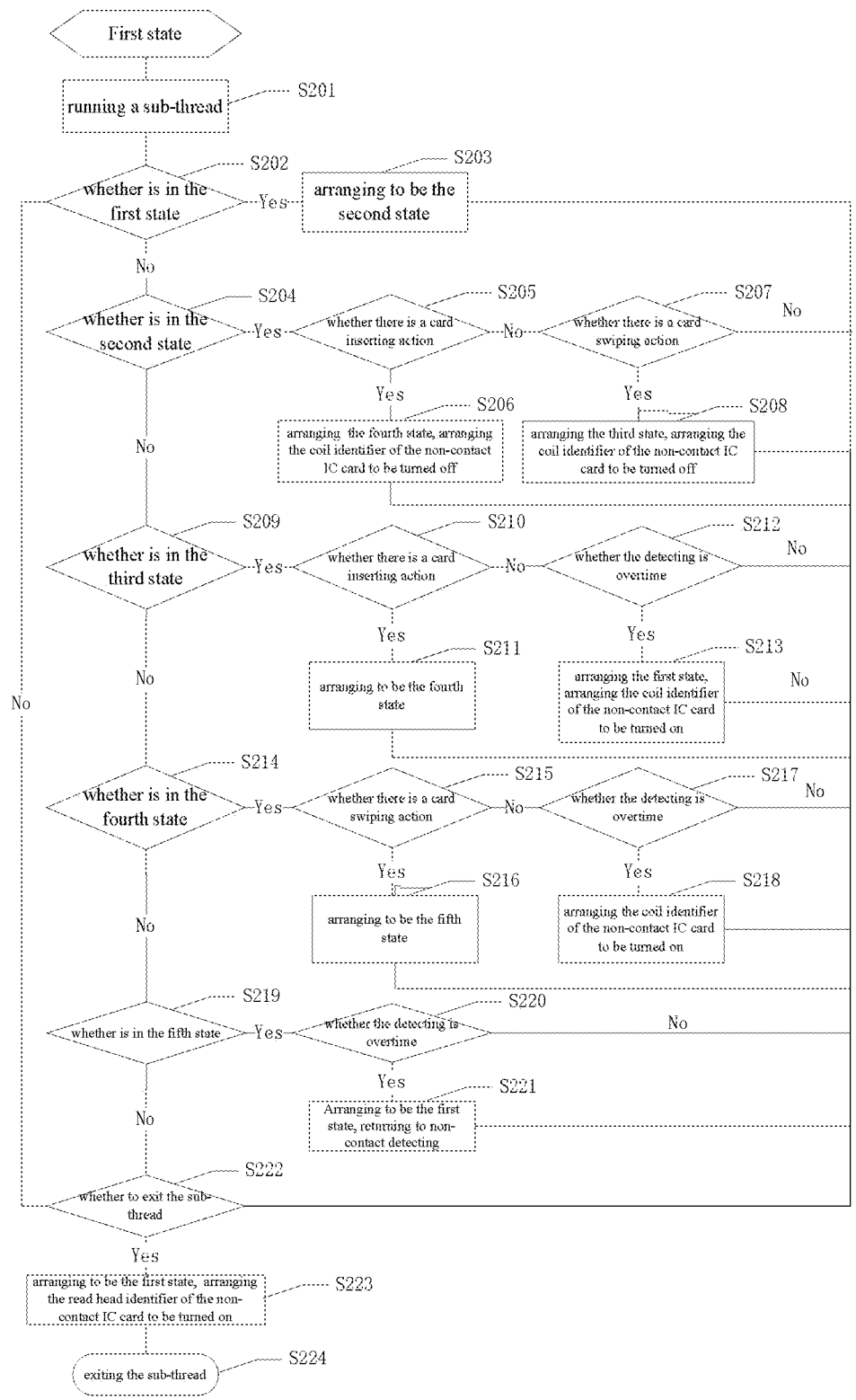
FIG. 3 is a schematic flowchart of step S20 provided in a second embodiment of the present application.

As shown in FIG. 3, in this embodiment, the implementation process of step S20 specifically includes:

Step S201: running a sub-thread to detect the current card swiping state;

Step S202: detecting whether the current card swiping state is in the first state, if yes, go to step S203, otherwise go to step S204;

Step S203: arranging the current card swiping state to be the second state, and go to step S222;

Step S204: detecting whether the current card swiping state is in the second state, if yes, go to step S205, otherwise go to step S209;

Step S205: detecting whether there is a card inserting action, if yes, go to step S206, otherwise go to step S207;

Step S206: arranging the current card swiping state to be the fourth state, arranging the coil identifier of the non-contact IC card to be turned off, and go to step S222;

Step S207: detecting whether there is a card swiping action, if yes, go to step S208, otherwise go to step S222;

Step S208: arranging the current card swiping state to be the third state, arranging the coil identifier of the non-contact IC card to be turned off, and proceed to step S222;

Step S209: detecting whether the current card swiping state is in the third state, if yes, go to step S210, otherwise go to step S214;

Step S210: detecting whether there is a card inserting action, if yes, go to step S211, otherwise go to step S212;

Step S211: arranging the current card swiping state to be the fourth state, and go to step S222;

Step S212: determining whether the operation of detecting the current card swiping state is overtime, if yes, go to step S213, otherwise go to step S222;

Step S213: arranging the current card swiping state to be the first state, arranging the coil identifier of the non-contact IC card to be turned on, and go to step S222;

Step S214: detecting whether the current card swiping state is in the fourth state, if yes, go to step S215, otherwise go to step S219;

Step S215: detecting whether there is a card swiping action, if yes, go to step S216, otherwise go to step S217;

Step S216, arranging the current card swiping state to be the fifth state, and go to step S222;

Step S217: determining whether the operation of detecting the current card swiping state is overtime, if yes, go to step S218, otherwise, go to step S222;

Step S218: arranging the coil identifier of the non-contact IC card to be turned on, and go to step S223;

Step S219: detecting whether the current card swiping state is in the fifth state, if yes, go to step S220, otherwise, go to step S222;

Step S220: determining whether the operation of detecting the current card swiping state is overtime, if yes, go to step S221, otherwise go to step S222;

Step S221: arranging the current card swiping state to be the first state, arranging the coil identifier of the non-contact IC card to be turned on, and go to step S222;

Step S222: determining whether to exit the sub-thread (that is, whether to exit the detection of the current card swiping state), if yes, go to step S223, otherwise go to step S202;

Step S223: arranging the current card swiping state to be the first state, and arranging the read head identifier of the non-contact IC card to be turned on, and go to step S224;

Step S224: exiting the sub-thread.

Among them, the first state is an initial state, the second state is that the magnetic stripe card is not detected when the card is inserted into the card slot, the third state is that the magnetic stripe card is detected when the card is inserted into the card slot, the fourth state is that the magnetic stripe card is not detected when the card is pulled out of the card slot, and the fifth state is that the magnetic stripe card is detected when the card is pulled out of the card slot.

Figure 4:
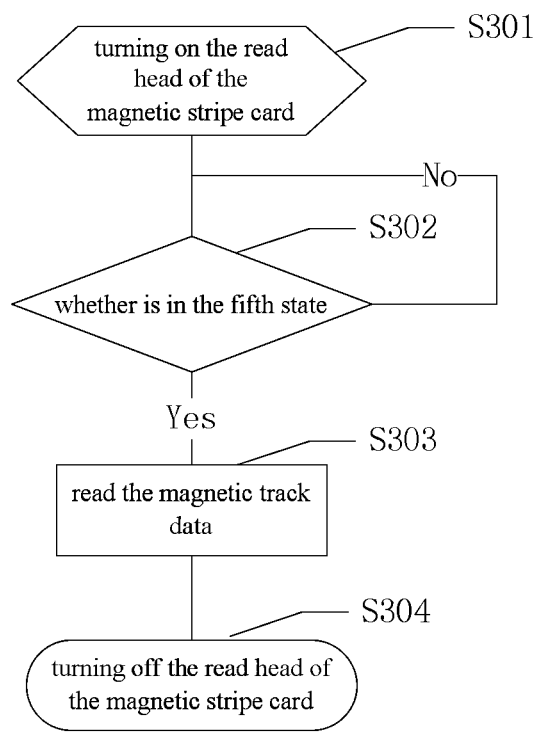
FIG. 4 is a schematic diagram of a card reading process of a magnetic stripe card provided in a second embodiment of the present application.

As shown in FIG. 4, in this embodiment, based on the implementation process shown in FIG. 3, the card reading process of the magnetic stripe card is specifically as follows:

Step S301: turning on the read head of the magnetic stripe card, and go to step S302;

Step S302: detecting whether the card swiping state is in the fifth state, if yes, go to step S303, otherwise go to step S302;

Step S303: controlling the read head of the magnetic stripe card to read the magnetic track data, and then go to step S304;

Step S304: turning off the read head of the magnetic stripe card.

Figure 5:
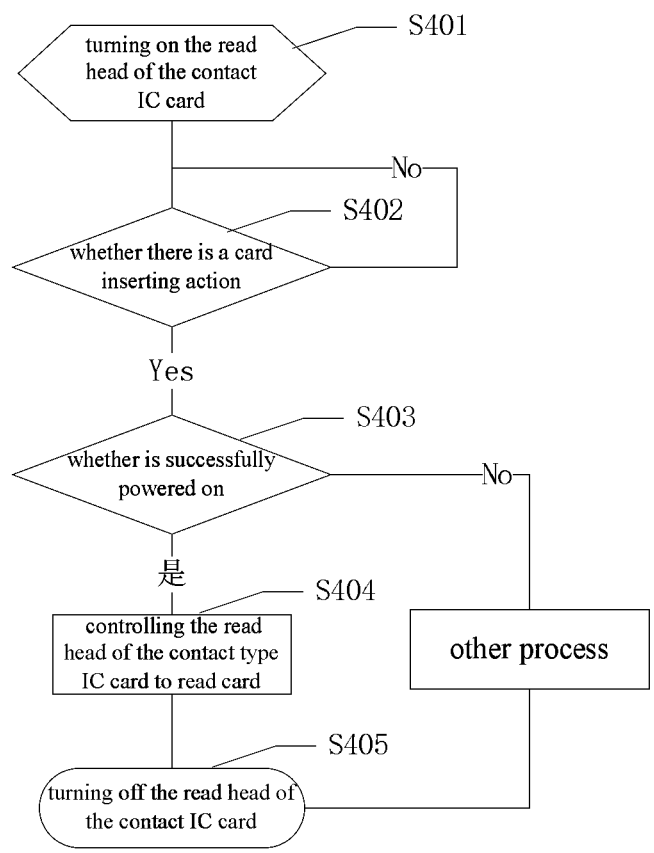
FIG. 5 is a schematic diagram of a card reading process of a contact IC card provided in a second embodiment of the present application.

As shown in FIG. 5, in the embodiment, based on the implementation process shown in FIG. 3, the card reading process of the contact IC card is specifically as follows:

Step S401: turning on the read head of the contact IC card, and go to step S402;

Step S402: detecting whether there is a card inserting action, if yes, go to step S403, otherwise go to step S402;

Step S403: detecting whether the card is successfully powered on, if yes, go to step S404, otherwise go to step S405;

Step S404: controlling the read head of the contact type IC card to read the chip data of the contact type IC card, and go to step S405;

Step S405: turning off the read head of the contact IC card.

Figure 6:
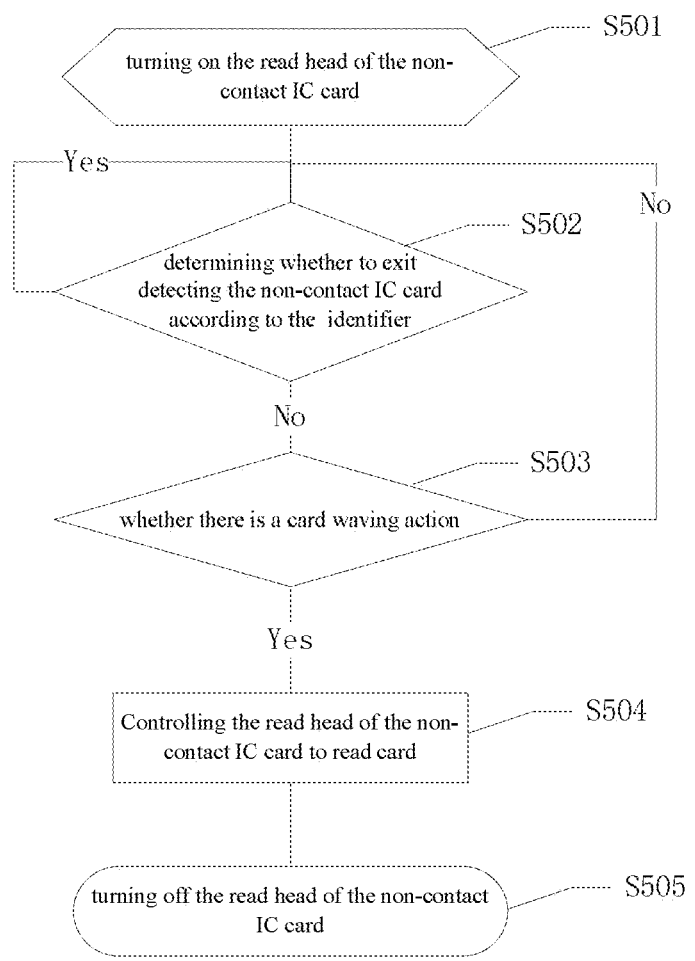
FIG. 6 is a schematic diagram of a card reading process of a non-contact IC card provided in a second embodiment of the present application.

As shown in FIG. 6, in the embodiment, based on the implementation process shown in FIG. 3, the card reading process of the non-contact IC card is specifically as follows:

Step S501: turning on the read head of the non-contact IC card, and go to step S502;

Step S502: determining whether to exit detecting the non-contact IC card according to the coil identifier of the non-contact IC card, if yes, go to step S502, otherwise, go to step S503;

Step S503: detecting whether there is a card waving action, if yes, go to step S504, otherwise go to step S505;

Step S504: controlling the read head of the non-contact IC card to read the coil data of the non-contact IC card, and go to step S505;

Step S505: turning off the read head of the non-contact IC card.

Third Embodiment

In the embodiment, the payment terminal includes an application layer, an intermediate layer, and a system layer, and the methods described in the first and second embodiments are executed by the intermediate layer. The traditional payment terminal only includes the application layer and the system layer. In the embodiment, by adding the intermediate layer between the application layer and the system layer, it is possible to add the intermediate layer without changing the existing system architecture of the payment terminal to achieve the above method. The specific implementation is as follows:

1. For the system layer, the system interface provided by the system layer is not changed;
2. For the intermediate layer, an intermediate interface is provided by the intermediate layer, the definition of the intermediate interface is realized by rewriting the system interface definition, specifically: rewriting the system interface (mainly the interface about the card operation, such as the card detection interface), keeping the definition parameters of the system interface remain unchanged, rewriting the function name of the system interface, and then defining the name of the intermediate interface as the name of the system interface through a macro definition, and an intermediate interfaces with different function names can get exactly the same definition parameters and names as the system interface;
3. For the application layer, the application layer originally called the system interface, but now it calls the intermediate interface. Since the intermediate interface and the system interface have the same name, there is no change at all for the application layer.

In the embodiment, taking a specific example as an embodiment, if the function of a system interface is: "int FUN_A(int iParam)"; the function name rewriting operation of the intermediate interface is specifically as follows:

Make the following macro definitions in the header file, and then provide it to the application layer:

define FUN_A_FUN_A//; defining the function of the intermediate layer interface as the function of the system interface through the macro definition The implementation process in the C file is as follows:

int_FUN_A(int iParam)//; defining a function similar to the function of the system interface, the difference is only in the function name {
int iRet;
undef FUN_A //; undefining the macro definition here, so that
the following operations can call
the system interface
iRet = FUN_A(iParam);//; calling the function of the system interface
... //; doing some other processing
return iRet;//; returning the return value to the application layer
}

Figure 7:
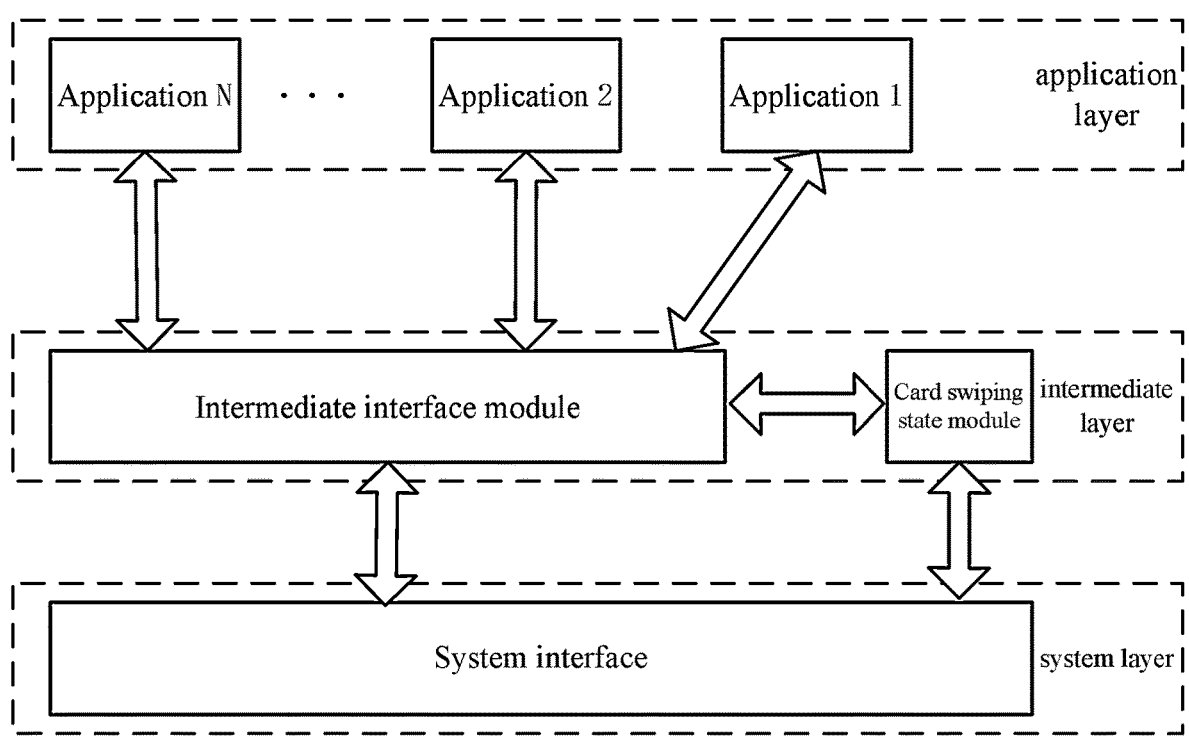
FIG. 7 is a schematic diagram of a system architecture of a payment terminal provided in a third embodiment of the present application.

As shown in FIG. 7, the system architecture of the payment terminal is exemplarily shown, and the application layer is configured for running various applications supported by the payment terminal (FIG. 7 exemplarily shows applications 1, 2, . . . , N, Among them, N≥1 and N is an integer), mainly related to card payment applications; the intermediate layer includes the intermediate interface module and the card swiping state detection module; the system layer includes the system interface.

In specific applications, the process shown in FIG. 3 is mainly executed by the card swiping state detection module in the intermediate layer.

It should be understood that the size of the sequence number of each step in the foregoing embodiment does not mean the sequence of execution. The execution sequence of each process should be determined by its function and internal logic, and should not constitute any limitation on the implementation process of the embodiment of the present application.

In specific applications, the method provided in the first or second embodiment can also be executed by any terminal device with a data processing function connected to the payment terminal, for example, a personal computer, a tablet computer, a mobile phone, a personal digital assistant, a cloud server, etc.

Fourth Embodiment

Figure 8:
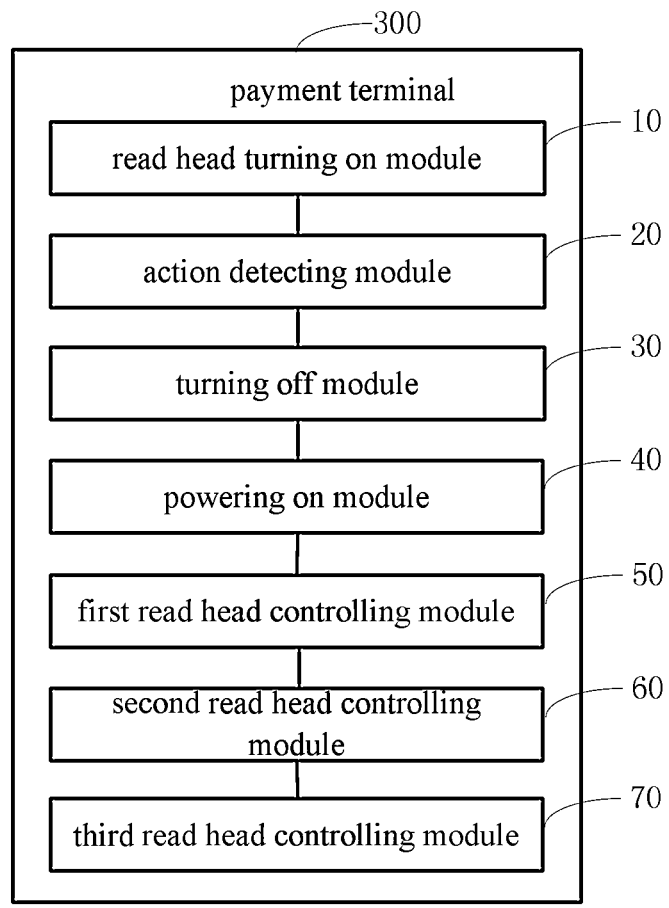
FIG. 8 is a schematic structural diagram of a payment terminal provided by a fourth embodiment of the present application.

As shown in FIG. 8, the embodiment provides a payment terminal 300, which has the card reading function of the magnetic stripe card, the contact IC card, and the non-contact IC card, and is used to perform the steps of the method in the first or second embodiment, the payment terminal 100 includes:

a read head turning on module 10, configured for turning on a read head of the magnetic stripe card, a read head of the contact IC card, and a coil of the non-contact IC card;

an action detecting module 20, configured for detecting card reading actions; wherein the card reading actions comprise card an inserting action, a card swiping action, and a card waving action;

a turning off module 30, configured for turning off, if the card inserting action is detected, the coil of the non-contact IC card;

a powering on module 40, configured for powering on the card when the card reaches a bottom of a card slot of the payment terminal;

a first read head controlling module 50, configured for controlling, if the card is successfully powered on, the read head of contact IC card to read the card;

a second read head controlling module 60, configured for controlling, if the card fails to be powered on, the read head of the magnetic stripe card to read the card when the card swiping action is detected; and a third read head controlling module 70, configured for controlling, if the card waving action is detected, the coil of the non-contact IC card to read card.

In specific applications, the payment terminal in the embodiment may be the payment terminal in the first or third embodiment, and the modules 10 to 70 may be system program modules of the payment terminal, for example, the system program modules operated by the intermediate layer in the third embodiment.

Fifth Embodiment

Figure 9:
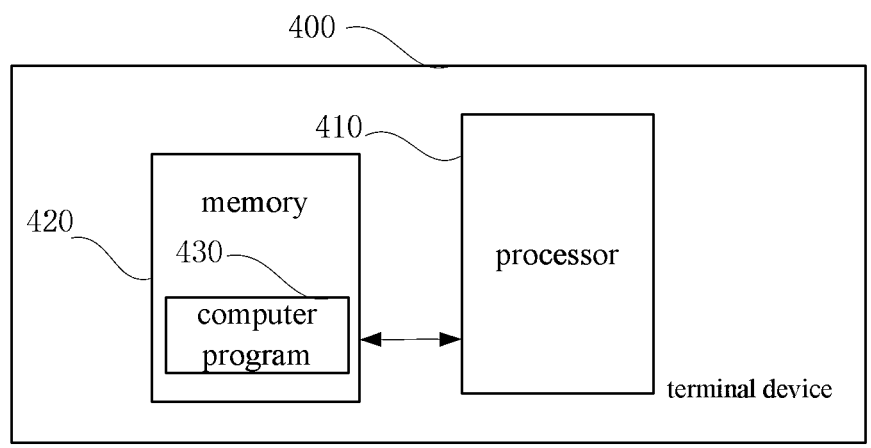
FIG. 9 is a schematic diagram of a terminal device provided by a fifth embodiment of the present application.

As shown in FIG. 9, the embodiment provides a terminal device 400, including: a processor 410, a memory 420, and a computer program 430 stored in the memory 420 and running on the processor 410, such as a payment program. The processor 410 implements the steps in the foregoing method embodiments when the computer program 430 is executed, for example, steps S10 to S70 shown in FIG. 2. Alternatively, when the processor 410 executes the computer program 430, the functions of the modules in the foregoing device embodiments, for example, the functions of the modules 10 to 70 shown in FIG. 8 are realized.

Exemplarily, the computer program 430 can be divided into one or more modules, and the one or more modules are stored in the memory 420 and executed by the processor 410 to complete the present application. The one or more modules may be a series of computer program instruction segments capable of completing specific functions, and the instruction segments are used to describe the execution process of the computer program 430 in the terminal device 400. For example, the computer program 430 can be divided into a read head turning on module, an action detecting module, a turning off module, a powering on module, a first read head controlling module, a second read head controlling module, and a third read head controlling module, and the specific functions of the modules are as follows:

the read head turning on module, configured for turning on a read head of the magnetic stripe card, a read head of the contact IC card, and a coil of the non-contact IC card;

the action detecting module, configured for detecting card reading actions; wherein the card reading actions comprise card an inserting action, a card swiping action, and a card waving action;

the turning off module, configured for turning off, if the card inserting action is detected, the coil of the non-contact IC card;

the powering on module, configured for powering on the card when the card reaches a bottom of a card slot of the payment terminal;

the first read head controlling module, configured for controlling, if the card is successfully powered on, the read head of contact IC card to read the card;

the second read head controlling module, configured for controlling, if the card fails to be powered on, the read head of the magnetic stripe card to read the card when the card swiping action is detected; and the third read head controlling module, configured for controlling, if the card waving action is detected, the coil of the non-contact IC card to read card.

The terminal device 400 may be a computing device such as a desktop computer, a notebook, a palmtop computer, and a cloud server. The terminal device may include, but is not limited to, a processor 410 and a memory 420. Those skilled in the art can understand that FIG. 6 is only an example of the terminal device 400, and does not constitute a limitation on the terminal device 400. It may include more or less components than those shown in the figure, or a combination of certain components, or different components. For example, the terminal device may also include input and output devices, network access devices, buses, and so on.

The so called processor 410 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The memory 420 can be an internal storage unit of the terminal device 400, such as a hard disk or a memory of the terminal device 400. The memory 420 can also be an external storage device of the terminal device 400, such as a plug-in hard disk, a SMC (Smart Media Card), a SD (Secure Digital) card, a FC (Flash Card) equipped on the terminal device 400. Further, the memory 420 may include both the internal storage unit and the external storage device of the terminal device 400, either. The memory 420 is configured to store the computer programs, and other procedures and data needed by the terminal device 400 for determining wellbore cross-sectional shape. The memory 420 can also be configured to storing data that has been output or being ready to be output temporarily.

It can be clearly understood by the persons skilled in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

Those skilled in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory and software distribution medium, etc.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A method for card reading applied to a payment terminal, the payment terminal being equipped with reading function to a magnetic stripe card, a contact IC card, and a non-contact IC card, and the method comprising:
    turning on a read head of the magnetic stripe card, a read head of the contact IC card, and a coil of the non-contact IC card;
    detecting card reading actions; wherein the card reading actions comprise a card inserting action, a card swiping action, and a card waving action;
    turning off, if the card inserting action is detected, the coil of the non-contact IC card;
    powering on a card when the card reaches a bottom of a card slot of the payment terminal;
    controlling, if the card is successfully powered on, the read head of contact IC card to read the card;
    controlling, if the card fails to be powered on, the read head of the magnetic stripe card to read the card when the card swiping action is detected;

controlling, if the card waving action is detected, the coil of the non-contact IC card to read the card; and issuing, if the card reading action is not changed overtime or the card reading is not successful overtime, a corresponding alarm prompt, and then entering the step of turning on the read head of the magnetic stripe card, the read head of the contact IC card, and the coil of the non-contact IC card after the alarm prompt is removed.

2. The method for card reading according to claim 1, wherein the detecting card reading actions comprise:

detecting a current card swiping state;

arranging, if the current card swiping state is in a first state, the current card swiping state to be a second state, and entering an operation of determining whether to exit the current card swiping state;

detecting, if the current card swiping state is in the second state, whether there is the card inserting action;

arranging, if the card inserting action is detected when the current card swiping state is in the second state, the current card swiping state to be a fourth state, and arranging to turn off a coil identifier of the non-contact IC card, and entering an operation of determining whether to exit the current card swiping state;

detecting, if the current card swiping state is in a third state, whether there is the card inserting action;

arranging, if the card inserting action is detected when the current card swiping state is in the third state, the current card swiping state to be the fourth state, and entering an operation of determining whether to exit the current card swiping state;

detecting, if the current card swiping state is in the fourth state, whether there is the card swiping action;

arranging, if the card inserting action is detected when the current card swiping state is in the fourth state, the current card swiping state to be a fifth state, and entering an operation of determining whether to exit the current card swiping state;

determining, if the current card swiping state is in the fifth state, whether an operation of detecting the current card swiping state is overtime;

arranging, if detecting the current card swiping state is overtime, the current card swiping state to be the first state, and arranging to turn on the coil identifier of the non-contact IC card and entering an operation of determining whether to exit the current card swiping state; otherwise, entering an operation of determining whether to exit the current card swiping state; and wherein the first state is an initial state, the second state is that the magnetic stripe card is not detected when the card is inserted into the card slot, the third state is that the magnetic stripe card is detected when the card is inserted into the card slot, the fourth state is that the magnetic stripe card is not detected when the card is pulled out of the card slot, and the fifth state is that the magnetic stripe card is detected when the card is pulled out of the card slot.

3. The method for card reading according to claim 2, wherein after detecting, if the current card swiping state is in the second state, whether there is the card inserting action, the method further comprises:

detecting, if the card inserting action is not detected when the current card swiping state is in the second state, whether there is the card swiping action; and arranging, if the card swiping action is detected, the current card swiping state to be the third state, and arranging to turn off the coil identifier of the non-contact IC card and entering the operation of determining whether to exit the current card swiping state;

otherwise, entering the operation of determining whether to exit the current card swiping state.

4. The method for card reading according to claim 3, wherein after detecting the current card swiping state, the method further comprises:

detecting, if the current card swiping state is not in the first state, whether the current card swiping state is in the second state;

detecting, if the current card swiping state is not in the second state, whether the current card swiping state is in the third state;

detecting, if the current card swiping state is not in the third state, whether the current card swiping state is in the fourth state;

detecting, if the current card swiping state is not in the fourth state, whether the current card swiping state is in the fifth state;

determining, if the current card swiping state is not in the fifth state, whether to exit the operation of detecting the current card swiping state; and arranging, if the operation of detecting the current swiping state is exited, the current swiping state to be the first state, and arranging to turn on the coil identifier of the non-contact IC card.

5. The method for card reading according to claim 3, wherein the payment terminal comprises an application layer, an intermediate layer, and a system layer, and the method for card reading is executed by the intermediate layer.

6. The method for card reading according to claim 2, wherein after detecting, if the current card swiping state is in the third state, whether there is the card inserting action, the method further comprises:

determining, if the card inserting action is not detected when the current card swiping state is in the third state, whether an operation of detecting the current card swiping state is overtime; and arranging, if detecting the current card swiping state is overtime, the current card swiping state to be the first state, and arranging to turn on the coil identifier of the non- contact IC card and entering the operation of determining whether to exit the current card swiping state; otherwise, entering the operation of determining whether to exit the current card swiping state.

7. The method for card reading according to claim 6, wherein after detecting the current card swiping state, the method further comprises:

detecting, if the current card swiping state is not in the first state, whether the current card swiping state is in the second state;

detecting, if the current card swiping state is not in the second state, whether the current card swiping state is in the third state;

detecting, if the current card swiping state is not in the third state, whether the current card swiping state is in the fourth state;

detecting, if the current card swiping state is not in the fourth state, whether the current card swiping state is in the fifth state;

determining, if the current card swiping state is not in the fifth state, whether to exit the operation of detecting the current card swiping state; and arranging, if the operation of detecting the current swiping state is exited, the current swiping state to be the first state, and arranging to turn on the coil identifier of the non-contact IC card.

8. The method for card reading according to claim 6, wherein the payment terminal comprises an application layer, an intermediate layer, and a system layer, and the method for card reading is executed by the intermediate layer.

9. The method for card reading according to claim 2, wherein after detecting, if the current card swiping state is in the fourth state, whether there is the card swiping action, the method further comprises:
  determining, if the card swiping action is not detected when the current card swiping state is in the third state, whether an operation of detecting the current card swiping state is overtime; and
  arranging, if detecting the current card swiping state is overtime, to turn on the coil identifier of the non-contact IC card and entering the operation of determining whether to exit the current card swiping state; otherwise, entering the operation of determining whether to exit the current card swiping state.

10. The method for card reading according to claim 9, wherein after detecting the current card swiping state, the method further comprises:
  detecting, if the current card swiping state is not in the first state, whether the current card swiping state is in the second state;
  detecting, if the current card swiping state is not in the second state, whether the current card swiping state is in the third state;
  detecting, if the current card swiping state is not in the third state, whether the current card swiping state is in the fourth state;
  detecting, if the current card swiping state is not in the fourth state, whether the current card swiping state is in the fifth state;
  determining, if the current card swiping state is not in the fifth state, whether to exit the operation of detecting the current card swiping state; and
  arranging, if the operation of detecting the current swiping state is exited, the current swiping state to be the first state, and arranging to turn on the coil identifier of the non-contact IC card.

11. The method for card reading according to claim 9, wherein the payment terminal comprises an application layer, an intermediate layer, and a system layer, and the method for card reading is executed by the intermediate layer.

12. The method for card reading according to claim 2, wherein after detecting the current card swiping state, the method further comprises:
  detecting, if the current card swiping state is not in the first state, whether the current card swiping state is in the second state;
  detecting, if the current card swiping state is not in the second state, whether the current card swiping state is in the third state;
  detecting, if the current card swiping state is not in the third state, whether the current card swiping state is in the fourth state;
  detecting, if the current card swiping state is not in the fourth state, whether the current card swiping state is in the fifth state;
  determining, if the current card swiping state is not in the fifth state, whether to exit the operation of detecting the current card swiping state; and
  arranging, if the operation of detecting the current swiping state is exited, the current swiping state to be the first state, and arranging to turn on the coil identifier of the non-contact IC card.

13. The method for card reading according to claim 2, wherein the payment terminal comprises an application layer, an intermediate layer, and a system layer, and the method for card reading is executed by the intermediate layer.

14. The method for card reading according to claim 1, wherein the payment terminal comprises an application layer, an intermediate layer, and a system layer, and the method for card reading is executed by the intermediate layer.

15. A terminal device, comprising a memory, a processor, and a computer program stored in the memory and running on the processor, wherein the processor executes the computer program to implement steps as follows:
  turning on a read head of a magnetic stripe card, a read head of a contact IC card, and a coil of a non-contact IC card;
  detecting card reading actions; wherein the card reading actions comprise a card inserting action, a card swiping action, and a card waving action;
  turning off, if the card inserting action is detected, the coil of the non-contact IC card;
  powering on a card when the card reaches a bottom of a card slot of a payment terminal;
  controlling, if the card is successfully powered on, the read head of contact IC card to read the card;
  controlling, if the card fails to be powered on, the read head of the magnetic stripe card to read the card when the card swiping action is detected;
  controlling, if the card waving action is detected, the coil of the non-contact IC card to read the card; and
  issuing, if the card reading action is not changed overtime or the card reading is not successful overtime, a corresponding alarm prompt, and then entering the step of turning on the read head of the magnetic stripe card, the read head of the contact IC card, and the coil of the non-contact IC card after the alarm prompt is removed.

16. The terminal device according to claim 15, wherein the computer program comprises:
  a read head turning on module, configured for turning on the read head of the magnetic stripe card, the read head of the contact IC card, and the coil of the non-contact IC card;
  an action detecting module, configured for detecting card reading actions; wherein the card reading actions comprise the card inserting action, the card swiping action, and the card waving action;
  a turning off module, configured for turning off, if the card inserting action is detected, the coil of the non-contact IC card;
  a powering on module, configured for powering on a card when the card reaches the bottom of the card slot of the payment terminal;
  a first read head controlling module, configured for controlling, if the card is successfully powered on, the read head of contact IC card to read the card;
  a second read head controlling module, configured for controlling, if the card fails to be powered on, the read head of the magnetic stripe card to read the card when the card swiping action is detected; and a third read head controlling module, configured for controlling, if the card waving action is detected, the coil of the non-contact IC card to read the card.

17. A computer-readable storage medium, storing with a computer program, wherein the computer program is executed by a processor to implement steps as follows:
turning on a read head of a magnetic stripe card, a read head of a contact IC card, and a coil of a non-contact IC card;
detecting card reading actions; wherein the card reading actions comprise a card inserting action, a card swiping action, and a card waving action;
turning off, if the card inserting action is detected, the coil of the non-contact IC card;
powering on a card when the card reaches a bottom of a card slot of a payment terminal;
controlling, if the card is successfully powered on, the read head of contact IC card to read the card;
controlling, if the card fails to be powered on, the read head of the magnetic stripe card to read the card when the card swiping action is detected;
controlling, if the card waving action is detected, the coil of the non-contact IC card to read the card; and
issuing, if the card reading action is not changed overtime or the card reading is not successful overtime, a corresponding alarm prompt, and then entering the step of turning on the read head of the magnetic stripe card, the read head of the contact IC card, and the coil of the non-contact IC card after the alarm prompt is removed.

* * * * *